(12) United States Patent
Deiderich, III

(10) Patent No.: US 9,672,047 B1
(45) Date of Patent: Jun. 6, 2017

(54) SYSTEMS AND METHODS FOR ACCESSING A BOOTABLE PARTITION ON A SERIAL PERIPHERAL INTERFACE DEVICE

(71) Applicant: American Megatrends, Inc., Norcross, GA (US)

(72) Inventor: Michael Deiderich, III, Duluth, GA (US)

(73) Assignee: American Megatrends, Inc., Norcross, GA (US)

( * ) Notice: Subject to any disclaimer, the term of this patent is extended or adjusted under 35 U.S.C. 154(b) by 211 days.

(21) Appl. No.: 14/529,596

(22) Filed: Oct. 31, 2014

(51) Int. Cl.
*G06F 9/44* (2006.01)
*G06F 17/30* (2006.01)
*G06F 9/445* (2006.01)

(52) U.S. Cl.
CPC .......... *G06F 9/4411* (2013.01); *G06F 9/4401* (2013.01); *G06F 9/44505* (2013.01); *G06F 17/30115* (2013.01); *G06F 17/30218* (2013.01); *G06F 2009/44515* (2013.01)

(58) Field of Classification Search
CPC .... G06F 9/4411; G06F 9/4401; G06F 9/4406; G06F 9/44505; G06F 17/30115; G06F 17/30218
See application file for complete search history.

(56) References Cited

U.S. PATENT DOCUMENTS

| | | | | |
|---|---|---|---|---|
| 6,741,978 | B1* | 5/2004 | Rhoads | G06F 9/441 |
| 7,549,042 | B2* | 6/2009 | Glaum | G06F 8/68 713/1 |
| 2012/0159137 | A1* | 6/2012 | Khosravi | G06F 21/575 713/2 |
| 2012/0278600 | A1* | 11/2012 | Mese | G06F 9/4401 713/2 |
| 2015/0106612 | A1* | 4/2015 | Cao | G06F 9/4416 713/2 |

* cited by examiner

*Primary Examiner* — Dennis M Butler
(74) *Attorney, Agent, or Firm* — Lee & Hayes, PLLC

(57) ABSTRACT

Systems, methods, and apparatuses are disclosed that allow for accessing a bootable partition on a serial peripheral interface device. The device may store a file system image containing an operating system kernel, boot loaders, and other utilities. A firmware stored on the device may include drivers, protocols, and utilities used to make the file system image accessible to high-level firmware protocols operating within a computing system. The file system image may be recognized as a bootable partition and the computing system may be booted from the partition.

20 Claims, 6 Drawing Sheets

SYSTEMS AND METHODS FOR ACCESSING A BOOTABLE PARTITION ON A SERIAL PERIPHERAL INTERFACE DEVICE

BACKGROUND

In many computing systems, low-level instruction code, or firmware, is used as an intermediary between the hardware components of the computing system and high-level software executing on the computing system, such as an operating system. The firmware may provide a set of software routines that allow high-level software to interact with the hardware components of the computing system using standard calls. Configuring the firmware requires the use of complex operations, tools and utilities that are platform and operating system specific. It is with respect to these and other considerations that the disclosure made herein is presented.

SUMMARY

Technologies are described herein for systems and methods for accessing a bootable partition on a serial peripheral interface device. Through the utilization of the technologies and concepts presented herein, a file system image stored on a serial peripheral interface device may be made accessible to high-level firmware protocols operating in a computing system. Additionally, the computing system may be booted from the bootable partition stored on the serial peripheral interface device.

According to aspects presented herein, a file system image stored on a memory accessible through a serial peripheral interface may be exposed by a flash driver. A block storage driver in communication with the flash driver may be used to make the file system image accessible as a block storage device. The block storage device may be made accessible, by way of a file system protocol, as a partitioned file system image, and the partitioned file system image may be provided by a firmware setup utility as a bootable partition. The partitioned file system image may be used to boot a computing system.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
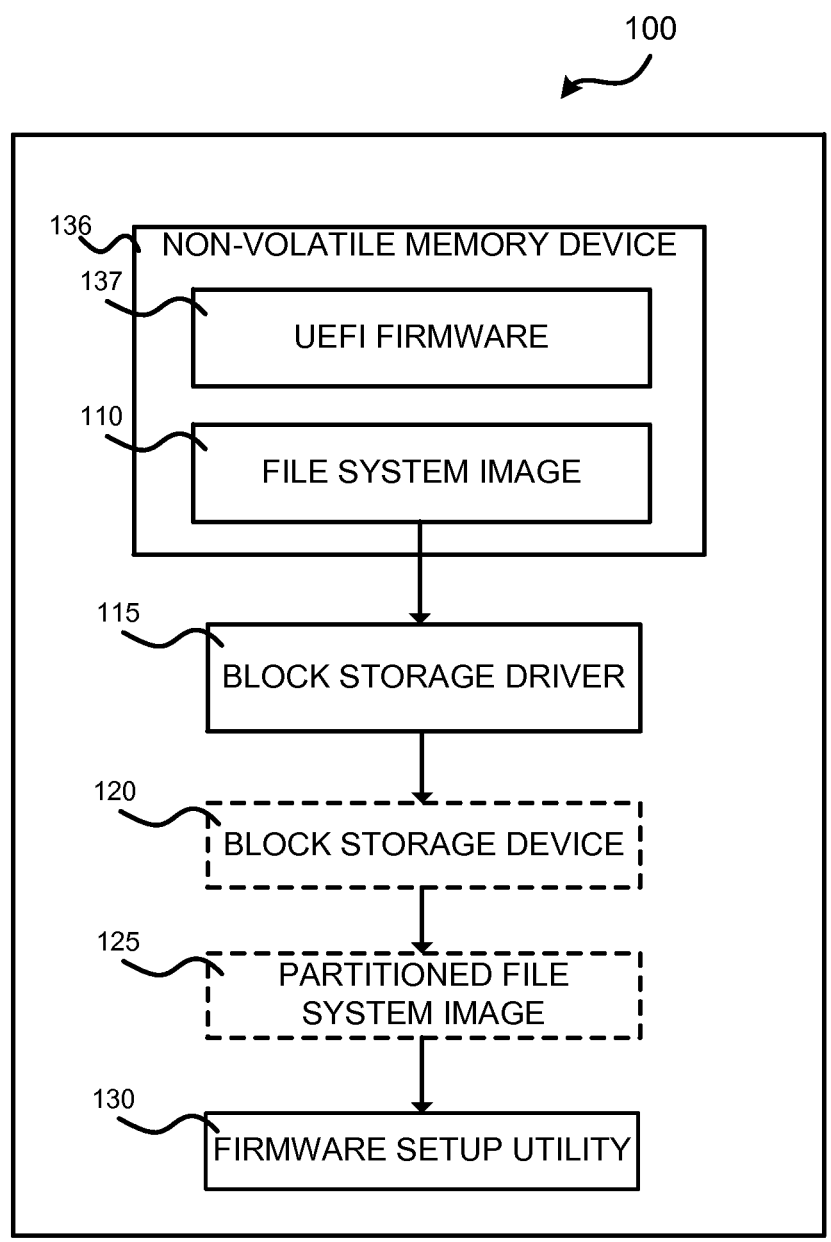
FIG. 1 is an illustrative computer architecture for practicing the examples discussed herein.

Configurations of the disclosure presented herein provide methods, systems, apparatuses, and computer-readable media for accessing a bootable partition on a serial peripheral interface device. In the following detailed description, references are made to the accompanying drawings that form a part hereof, and in which are shown by way of illustration specific configurations or examples. Referring now to the drawings, in which like numerals represent like elements throughout the several figures, aspects of an exemplary operating environment and the implementations provided herein will be described.

FIG. 1 and the following discussion are intended to provide a brief, general description of a suitable computing environment in which examples presented herein may be implemented. While the examples presented herein are described in the general context of program modules that execute in conjunction with the execution of a computer firmware, those skilled in the art will recognize that various examples may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multi-processor systems, microprocessor-based or programmable consumer electronics, minicomputers, mainframe computers, embedded systems, and the like. Examples presented herein may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for practicing the examples discussed herein will be described. It should be appreciated that although the examples described herein are discussed in the context of a conventional desktop or server computer, the examples may be utilized with virtually any type of computing device. FIG. 1 shows an illustrative computer architecture for a computing system 100 that is operative for accessing a bootable partition on a serial peripheral interface device.

In some configurations, the computing system 100 may include a non-volatile memory device 136. The non-volatile memory device 136 may be connected to the computing system 100 over a serial peripheral interface (illustrated in FIG. 5). According to some configurations, the non-volatile memory device 136 may store a file system image 110 and a Unified Extensible Firmware Interface ("UEFI") firmware 137.

The file system image 110 may be binary data that represents a file system. A file system may contain data structures such as files and directories that are arranged according to a particular file system format such as a FAT32, NTFS, or other file system format.

The UEFI firmware 137 may contain data and computer-executable instructions that are used in the process of booting the computing system 100 and loading an operating system. The computer-executable instructions are generally stored as program modules which may perform a variety of tasks within the computing system 100. A UEFI firmware 137 may be a firmware that confirms to the standards of the UEFI Specification (which will be discussed in more detail with regard to FIG. 5). According to some configurations, the UEFI firmware 137 may be stored on memory separate from the non-volatile memory device 136 that stores the file system image 110.

Among the program modules that may be stored within the UEFI firmware 137 are device drivers and protocols. A device driver, also referred to as a driver, may be a small program module that provides a method of interfacing with a hardware device connected to the computing system 100. In some instances, a driver may also be used to communicate with one or more other drivers.

A protocol may facilitate communications between program modules running within the computing system 100. In some instances, low-level protocols may be provided by the manufacturer of the UEFI firmware 137 for communication between internal program modules. In some other instances, high-level protocols may be provided by third-party manufacturers or may be used to communicate with drivers and program modules that are provided by third-party manufacturers. As used herein, the terms higher-level protocol and high-level protocol may refer to protocols that may be utilized by third-party firmware modules executing during the boot phase, or by runtime firmware modules. The terms lower-level protocol and low-level protocol may refer to protocols necessary to implement the UEFI specification and that may not be visible to third-party firmware modules executing during the boot phase, or to runtime firmware modules.

In some examples, the computing system 100 may contain a block storage driver 115. The block storage driver 115 may process requests to read and write to the file system image 110, making the file system image 110 accessible as a block storage device 120. A block storage device 120 may be visible to third-party drivers and high-level protocols operating within the computing system 100. In some configurations, drivers and protocols may communicate with the block storage device 120 by utilizing the block storage driver 115.

In some configurations, protocols on the computing system 100 may communicate with the block storage driver 115 to create a partition ("partitioned file system image 125") for the file system image 110 on the non-volatile memory device 136. According to some examples, a firmware setup utility 130 may be configured to provide the partitioned file system image 125 as a bootable partition by setting a configuration parameter.

If set as a bootable partition, the partitioned file system image 125 may be used to boot the computing system 100. By providing for a bootable partition that is accessible from a non-volatile memory device 136 connected to the computing system 100 over a serial peripheral interface, a firmware manufacture may help ensure that the computing system 100 will be able to be booted under circumstances such as recovery from failure, diagnostic testing, or installation.

Figure 2:
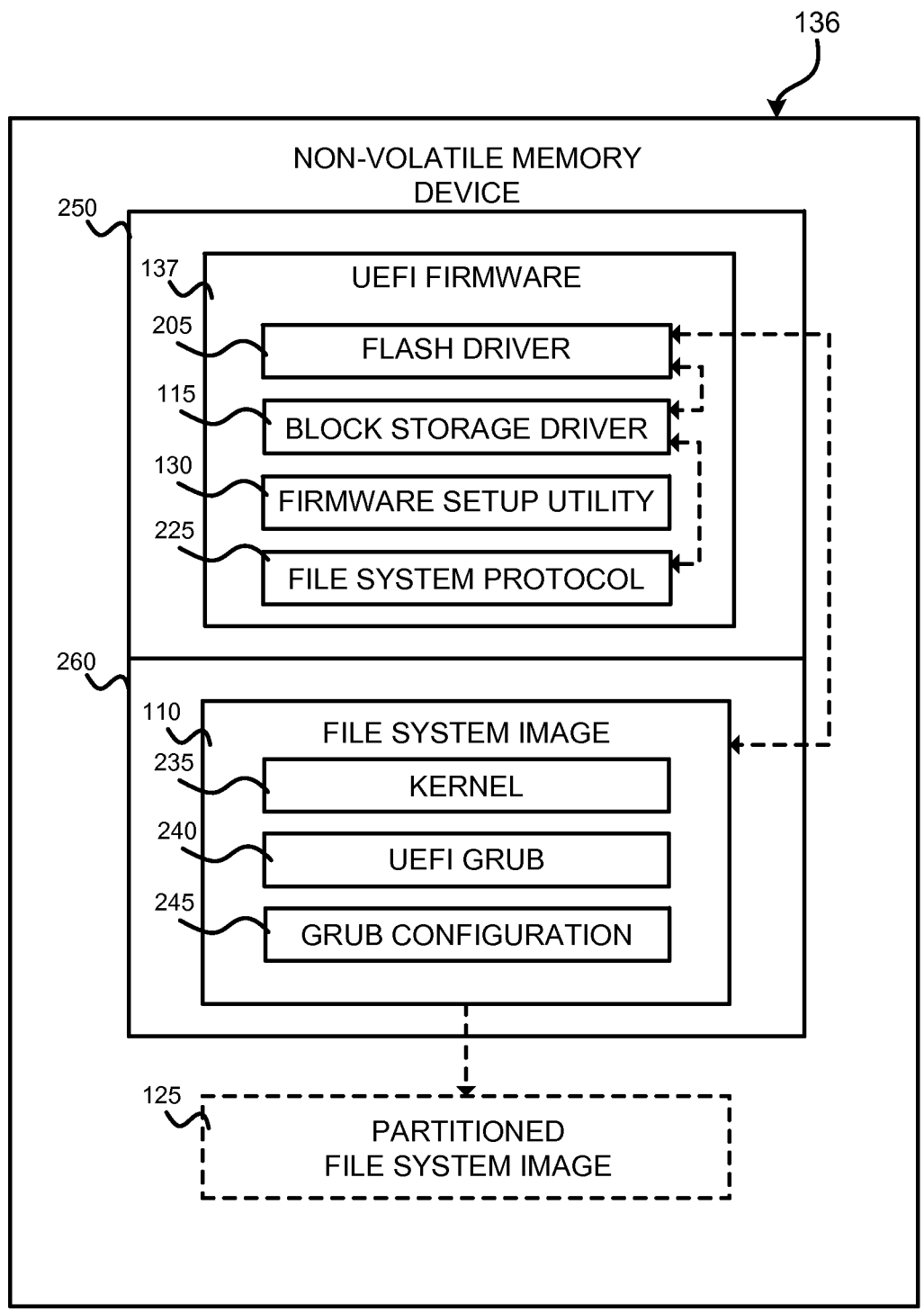
FIG. 2 is a block diagram showing aspects of a non-volatile memory device according to examples disclosed herein.

Referring now to FIG. 2, additional detail will be provided with respect to the non-volatile memory device 136. FIG. 2 is a block diagram showing aspects of a non-volatile memory device 136 according to examples disclosed herein.

In some configurations, the UEFI firmware 137 may include a flash driver 205 which may be utilized to interface with the file system image 110 over the serial peripheral interface. By interfacing with the file system image 110, the flash driver 205 may expose the file system image 110, as well as other data and instructions stored on the non-volatile memory device 136, to low-level firmware protocols operating within the computing system 100. Although the flash driver 205 may expose the contents to such low-level firmware protocols, the flash driver 205 may not generally make the contents accessible to higher-level firmware protocols running within the computing system 100, or to third-party drivers.

According to some examples, the UEFI firmware 137 may include the block storage driver 115 which allows the file system image 110 to be accessed as a block storage device 120. The block storage driver 115 may install the flash driver 205 and may utilize the flash driver 205 while the block storage driver 115 processes requests from higher-level firmware protocols to read and write to the file system image 110.

In some configurations, the UEFI firmware 137 may include several higher-level firmware protocols that may be executed in the computing system 100. A higher-level firmware protocol may be a file system protocol 225. The file system protocol 225 may include instructions used for manipulating data structures on the file system image 110 according to the particular file system format of the file system image 110. By communicating with the block storage driver 115, the file system protocol 225 may allow the files and directories stored within the file system image 110 to be accessed by runtime services and third-party boot services.

A file system protocol 225 may also allow the block storage device 120 to be recognized as a partition. In some implementations, the non-volatile memory device 136 may store one or more file system images 110; therefore, one or more partitioned file system images 125 may be made accessible using the file system protocols 225. Additionally, in some configurations, each of the file system images 110 may implement a different file system type. As such, more than one type of file system protocol 225 may be utilized to create multiple partitioned file system images 125. For example, and not limitation, the file system protocol 225 may correspond to a FAT32, NTFS, or any other type of file system implemented by the file system image 110. A partitioned file system image 125 may be configured as a read-only or a read-write partition.

In some implementations, the UEFI firmware 137 may include the firmware setup utility 130. The firmware setup utility 130 may be used to configure the UEFI firmware 137 and to set boot options for the computing system 100. The block storage driver 115 may make the file system image 110 accessible as a block storage device 120 that can be recognized by the firmware setup utility 130. In some implementations, file system protocols 225 may allow one or more partitions to be recognized within each block storage device 120.

The firmware setup utility 130 may present a configuration parameter for each partitioned file system image 125 that may be used to indicate whether the partitioned file system image 125 is a bootable partition. In some examples, the configuration parameter may be set to a default value when the file system image 110 is created. In some configurations, the configuration parameter may also be set through the firmware setup utility 130. Depending on the value of the configuration parameter, the firmware setup utility 130 may provide the partitioned file system image 125 as a bootable partition. The firmware setup utility 130 may also be used to select a bootable partition as the partitioned file system image 125 to be used to boot the computing system 100. It should be understood that more than one file system image 110 may be stored on the non-volatile memory device 136 and more than one partitioned file system image 125 may be provided by the firmware setup utility 130 as a bootable partition.

According to some implementations, the file system image 110 stored on the non-volatile memory device 136 may include an operating system kernel 235. The kernel 235 may provide networking functionality and a command-line interface. The kernel 235 may help to ensure that a functioning operating system is available and accessible to the computing system 100 during installation or after a failure. The kernel 235 might also be used for recovery purposes or to run diagnostics for the computing device. For example, the kernel 235 may be a Linux kernel, BSD kernel, XNU kernel, or other operating system kernel.

In some configurations, the file system image 110 may include a boot loader, such as a Unified Extensible Firmware Interface Grand Unified Boot Loader ("UEFI GRUB") 240, for loading the kernel 235. Although UEFI GRUB 240 is shown in FIG. 2 for illustration purposes, other suitable boot loaders, including Extensible Firmware Interface Linux Loader ("ELILO"), could alternatively be used. In some examples, the file system image 110 may also include configuration data ("GRUB configuration") 245 used to configure the boot loader as well as other utilities.

In some implementations, the file system image 110 may be upgradable by updating a non-critical block on which it is stored. The non-volatile memory device 136 may contain boot, main, and non-critical blocks for storing data and instructions. According to some examples, a boot block may be used to store the UEFI firmware 137 used to boot the computing system 100. In some implementations, the boot block may be configured as a read-only storage.

In some examples, utilities available for the UEFI firmware 137 may allow data and instructions stored in a non-critical block 260 to be flash updated. As used herein, flash updating may refer to a process by which the contents of a block on the non-volatile memory device 136 are erased and reprogrammed with new content. As illustrated in FIG. 2, the file system image 110 may be stored in such a non-critical block 260, and the UEFI firmware 137 may be stored in a boot block 250. In other configurations, the UEFI firmware 137 may be stored in a main block (not pictured) or a non-critical block 260. According to some examples, the file system image 110 can be changed, updated or upgraded by flash updating the non-critical block 260 on which the file system image 110 is stored. By flash updating the non-critical block 260, the new file system image 110 may conform to a different file system format, new versions of the kernel 235 may be stored, and various other utilities or files may be stored within the new file system image 110.

Figure 3:
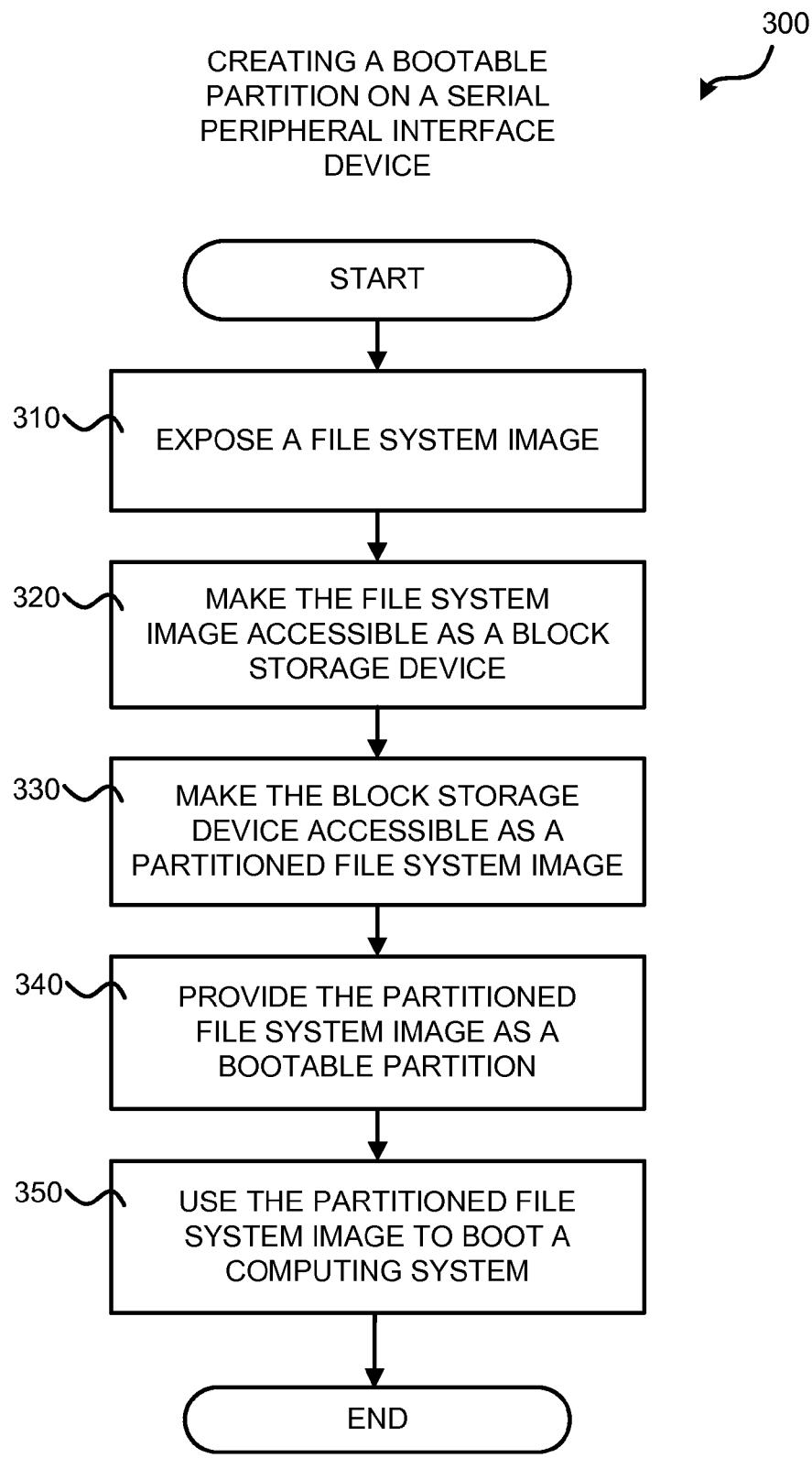
FIG. 3 is a flow diagram that illustrates a routine for creating a bootable partition on a serial peripheral interface device according to one or more examples presented herein.

Turning now to FIG. 3, additional details will be provided regarding the examples presented herein. In particular, FIG. 3 is a flow diagram that illustrates a routine 300 for creating a bootable partition on a serial peripheral interface device. The routine 300 may begin at operation 310 where a flash driver 205 may be utilized to expose a file system image 110 stored on a non-volatile memory device 136 accessible through a serial peripheral interface. The flash driver may expose the file system image 110 to low-level firmware protocols.

From operation 310, the routine 300 may proceed to operation 320, where a block storage driver 115 may be utilized to make the file system image 110 accessible as a block storage device 120. As discussed above, by accessing the file system image 110 as a block storage device 120, the contents of the file system image 110 may be made available to higher-level firmware protocols and third-party drivers. The block storage device 120 may also be recognized by the firmware setup utility 130.

From operation 320, the routine may proceed to operation 330, where a file system protocol 225 may be used to make the block storage device 120 accessible as a partitioned file system image 125. Multiple partitioned file system images 125 may be created from multiple file system images 110 stored on the non-volatile memory device 136.

Proceeding to operation 340, the firmware setup utility 130 may provide the partitioned file system image 125 on the non-volatile memory device 136 as a bootable partition. In some configurations, multiple partitioned file system images 125 may be provided as bootable partitions. Any of the bootable partitions might be used to boot the computing system 100.

From operation 340, the routine 300 may proceed to operation 350 where the UEFI firmware 137 may use a partitioned file system image 125 to boot the computing system 100. In some examples, the UEFI firmware 137 may use the kernel 235 and UEFI GRUB 240 contained in the file system image 110 to boot the computing system 100. From operation 350, the routine 300 may proceed to an end operation where the routine 300 ends.

Figure 4:
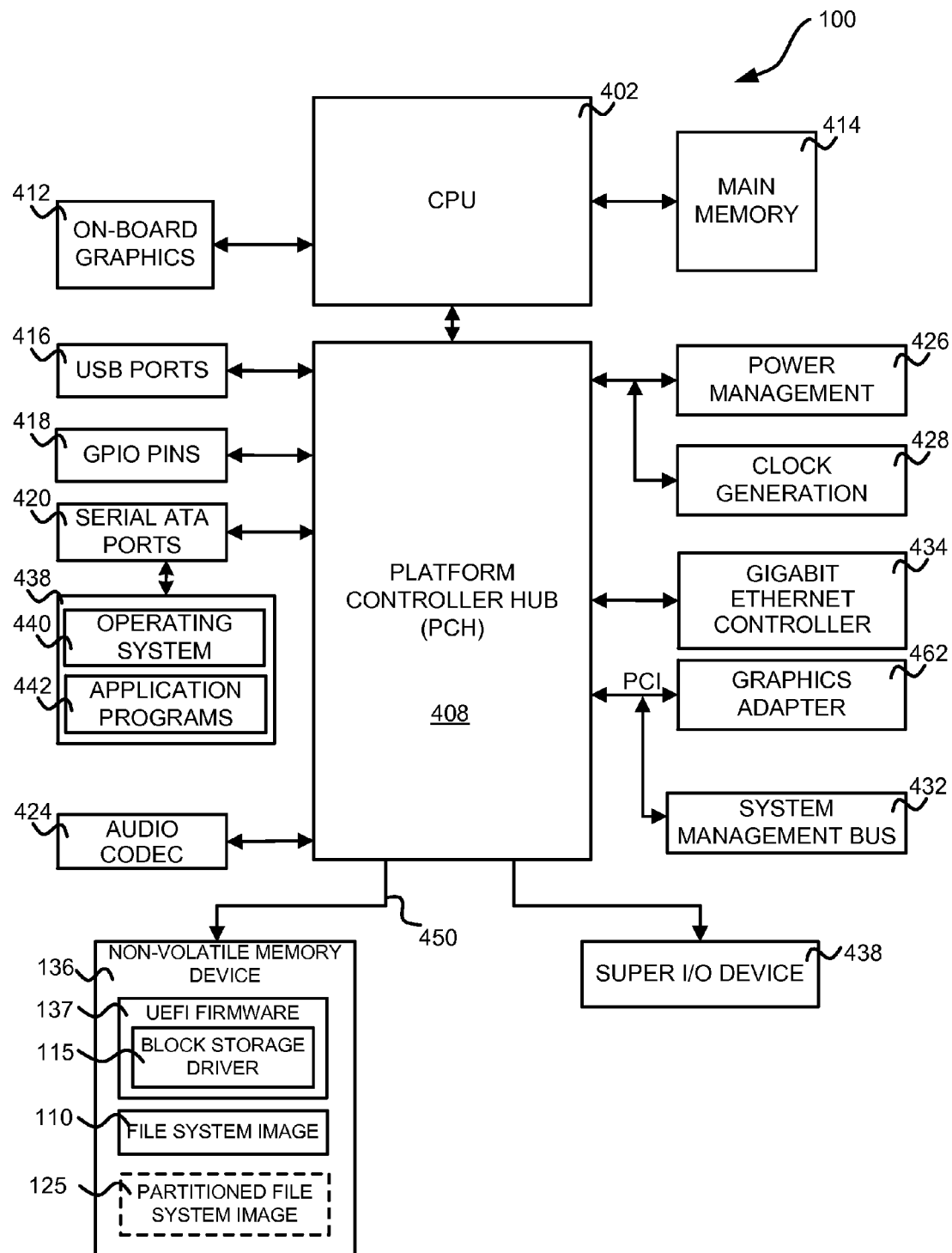
FIG. 4 is a computer architecture diagram that illustrates various components of a computer that provides an illustrative operating environment for the implementations presented herein.

Referring now to FIG. 4, a system diagram showing aspects of an illustrative computing system 100 for various examples of the concepts and technologies disclosed herein will be described. In order to provide the functionality described herein, the computing system 100 can include a baseboard, or "motherboard," which can be a printed circuit board to which a multitude of components or devices may be connected by way of a system bus or other electrical communication path. In one illustrative embodiment, a central processing unit ("CPU") 402 operates in conjunction with a Platform Controller Hub ("PCH") 408. The CPU 402 may be a standard central processor that performs arithmetic and logical operations necessary for the operation of the computing system 100. The computing system 100 may include a multitude of CPUs 402. Each CPU 402 might include multiple processing cores.

The CPU 402 provides an interface to a random access memory ("RAM") used as the main memory 414 in the computing system 100 and, possibly, to an on-board graphics adapter 412. The PCH 408 may provide an interface between the CPU 402 and the remainder of the computing system 100.

The PCH 408 may also be responsible for controlling many of the input/output functions of the computing system 100. In particular, the PCH 408 may provide one or more universal serial bus ("USB") ports 416, an audio codec 424, a Gigabit Ethernet Controller 434, and one or more general purpose input/output ("GPIO") pins 418. The USB ports 416 may include USB 2.0 ports, USB 3.0 ports and USB 3.1 ports among other USB ports. The audio codec 424 may include Intel High Definition Audio, Audio Codec '97 ("AC'97") and Dolby TrueHD among others.

The PCH 408 may also include functionality for providing networking functionality through a Gigabit Ethernet Controller 434. The Gigabit Ethernet Controller 434 is capable of connecting the computing system 100 to another computing system via a network. Connections which may be made by the Gigabit Ethernet Controller 434 may include LAN or WAN connections. LAN and WAN networking environments are commonplace in offices, enterprise-wide computer networks, intranets, and the internet.

The PCH 408 may also provide a bus for interfacing peripheral card devices such as a graphics adapter 462. In one embodiment, the bus comprises a PCI bus. The PCI bus may include a Peripheral Component Interconnect ("PCI") bus, a Peripheral Component Interconnect eXtended ("PCI-X") bus or a Peripheral Component Interconnect Express ("PCIe") bus among others. The PCH 408 may also provide a system management bus 432 for use in managing the various components of the computing system 100.

The PCH 408 is also configured to provide one or more interfaces for connecting mass storage devices to the computing system 100. For instance, according to an embodiment, the PCH 408 includes a serial advanced technology attachment ("SATA") adapter for providing one or more serial ATA ports 420. The serial ATA ports 420 may be connected to one or more mass storage devices storing an operating system 440 and application programs 442, such as the SATA disk drive 438. As known to those skilled in the art, an operating system 440 comprises a set of programs that control operations of a computer and allocation of resources. An application program 442 is software that runs on top of the operating system 440 software, or other runtime environment, and uses computer resources to perform application specific tasks desired by the user.

According to some implementations, the operating system 440 comprises the LINUX operating system. According to other implementations, the operating system 440 comprises a version of the WINDOWS operating system from MICROSOFT CORPORATION. According to other implementations, the operating system 440 can comprise the UNIX, Ubuntu, or Mac OS X operating system. It should be appreciated that other operating systems may also be utilized.

The mass storage devices connected to the PCH 408, and their associated computer-readable storage media, provide non-volatile storage for the computing system 100. Although the description of computer-readable storage media contained herein refers to a mass storage device, such as a hard disk or CD-ROM drive, it should be appreciated by those skilled in the art that computer-readable storage media can be any available media that can be accessed by the computing system 100.

By way of example, and not limitation, computer-readable storage media may comprise computer storage media and communication media. Computer storage media includes volatile and non-volatile, removable and non-removable media implemented in any method or technology for storage of information such as computer-readable instructions, data structures, program modules or other data. However, computer-readable storage media does not encompass transitory signals. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computing system 100.

A low pin count ("LPC") interface may be provided by the PCH 408 for connecting a Super I/O device 438. The Super I/O device 438 is responsible for providing a number of input/output ports, including a keyboard port, a mouse port, a serial interface, a parallel port, and other types of input/output ports.

An SPI 450 may also be provided by the PCH 408 for connecting a non-volatile memory device 136 used to store a UEFI firmware 137. The non-volatile memory device 136 may be a ROM or flash memory such as a non-volatile random access memory ("NVRAM"). Firmware generally may include program code containing basic routines that help to start up the computing system 100 and to transfer information between elements within the computing system 100. Some examples of firmware include Basic Input/Output System ("BIOS"), UEFI firmware 137, or Open Firmware among others. In some examples, the non-volatile memory device 136 may be connected over the LPC interface.

It should be appreciated that the program modules disclosed herein, including the UEFI firmware 137, may include software instructions that, when loaded into the CPU 402 and executed, transform a general-purpose computing system 100 into a special-purpose computing system 100 customized to facilitate all, or part of, the operations disclosed herein. As detailed throughout this description, the program modules may provide various tools or techniques by which the computing system 100 may participate within the overall systems or operating environments using the components, logic flows, and/or data structures discussed herein.

The CPU 402 may be constructed from any number of transistors or other circuit elements, which may individually or collectively assume any number of states. More specifically, the CPU 402 may operate as a state machine or finite-state machine. Such a machine may be transformed to a second machine, or a specific machine, by loading executable instructions contained within the program modules. These computer-executable instructions may transform the CPU 402 by specifying how the CPU 402 transitions between states, thereby transforming the transistors or other circuit elements constituting the CPU 402 from a first machine to a second machine, wherein the second machine may be specifically configured to perform the operations disclosed herein. The states of either machine may also be transformed by receiving input from one or more user input devices, network interfaces (such as the gigabit Ethernet controller 434), other peripherals, other interfaces, or one or more users or other actors. Either machine may also transform states, or various physical characteristics of various output devices such as printers, speakers, video displays, or otherwise.

Encoding the program modules may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, and the like. For example, if the storage media are implemented as semiconductor-based memory, the program modules may transform the physical state of the semiconductor memory 414, 136, 137 when the software or UEFI firmware 137 is encoded therein. For example, the software may transform the state of transistors, capacitors, or other discrete circuit elements constituting the semiconductor memory.

As another example, the storage media may be implemented using magnetic or optical technology such as hard drives or optical drives. In such implementations, the program modules may transform the physical state of magnetic or optical media, when the software is encoded therein. These transformations may include altering the magnetic characteristics of particular locations within given magnetic media. These transformations may also include altering the physical features or characteristics of particular locations within given optical media to change the optical characteristics of those locations. It should be appreciated that various other transformations of physical media are possible without departing from the scope and spirit of the present description.

It should be appreciated that the computing system 100 may comprise other types of computing devices, including hand-held computers, embedded computer systems, personal digital assistants, and other types of computing devices known to those skilled in the art. It is also contemplated that the computing system 100 may not include all of the components shown in FIG. 4, may include other components that are not explicitly shown in FIG. 4, or may utilize an architecture completely different than that shown in FIG. 4.

Figure 5:
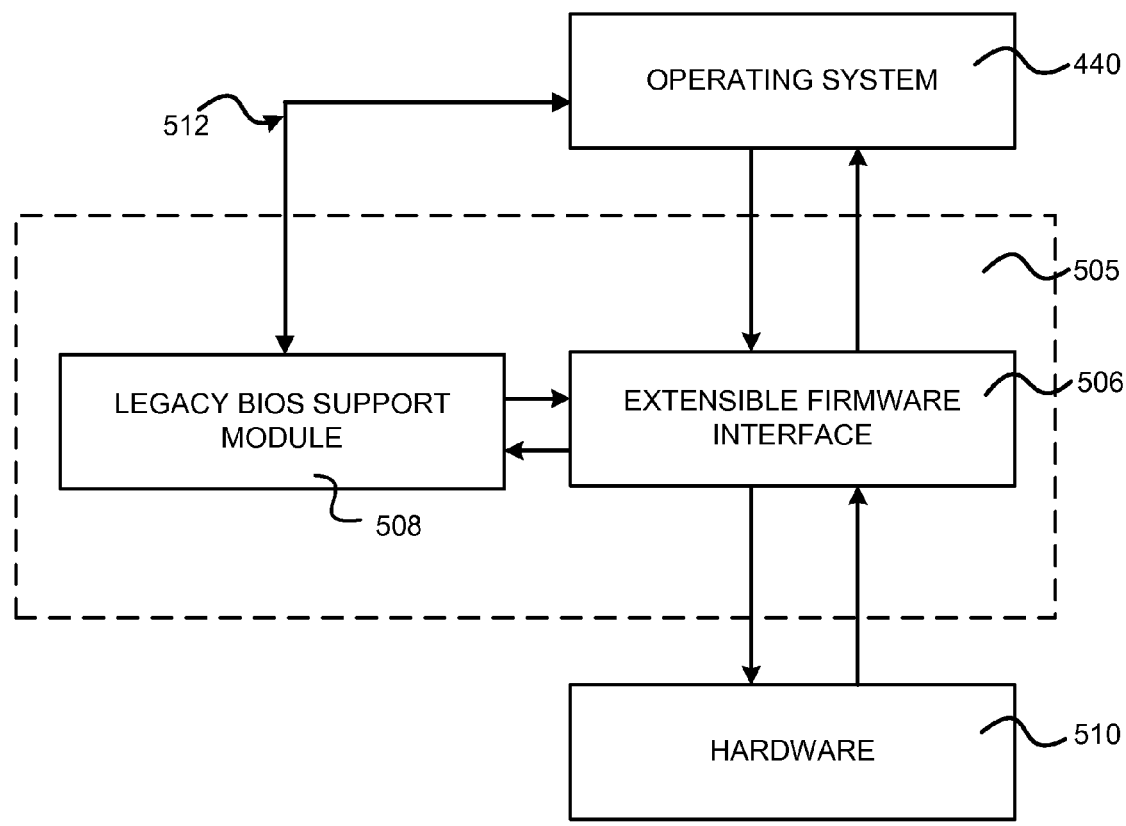
FIG. 5 is a block diagram illustrating aspects of an interface between a firmware and an operating system according to one or more examples presented herein.

Referring now to FIG. 5, a block diagram illustrates aspects of an interface between a UEFI firmware 137 and an operating system 440 according to one or more examples presented herein. As described with respect to FIG. 1, the UEFI firmware 137 may comprise a firmware compatible with the UEFI Specification from the UEFI FORUM. The UEFI Specification describes an interface between the operating system 440 and the UEFI firmware 137. The UEFI Specification also defines an interface that platform firmware may implement, and an interface that the operating system 440 may use while booting. How the UEFI firmware 137 implements the interface may be left up to the firmware manufacturer. The Specification can define a way for the operating system 440 and UEFI firmware 137 to communicate information necessary to support the operating system boot process.

According to some configurations, both a UEFI-compatible firmware 506 and a legacy BIOS support module 508 may be present in the UEFI firmware 137. This allows the computing system 100 to support a UEFI firmware interface and a legacy BIOS firmware interface. In order to provide this functionality, an interface 512 may be provided for use by legacy operating systems and applications. According to other configurations, only one of the UEFI-compatible firmware 506 and the legacy BIOS support module 508 may be present in the UEFI firmware 137. According to yet other configurations, the UEFI firmware 137 may interface with the hardware 510 through any of various other architectures, components, or modules for the UEFI firmware 137 without specific involvement of the UEFI-compatible firmware 506 or the legacy BIOS support module 508. Additional details regarding the operation and architecture of a UEFI Specification compliant-firmware can be found in the UEFI Specification and in the specifications that make up the EFI Framework, both of which are expressly incorporated herein by reference.

Figure 6:
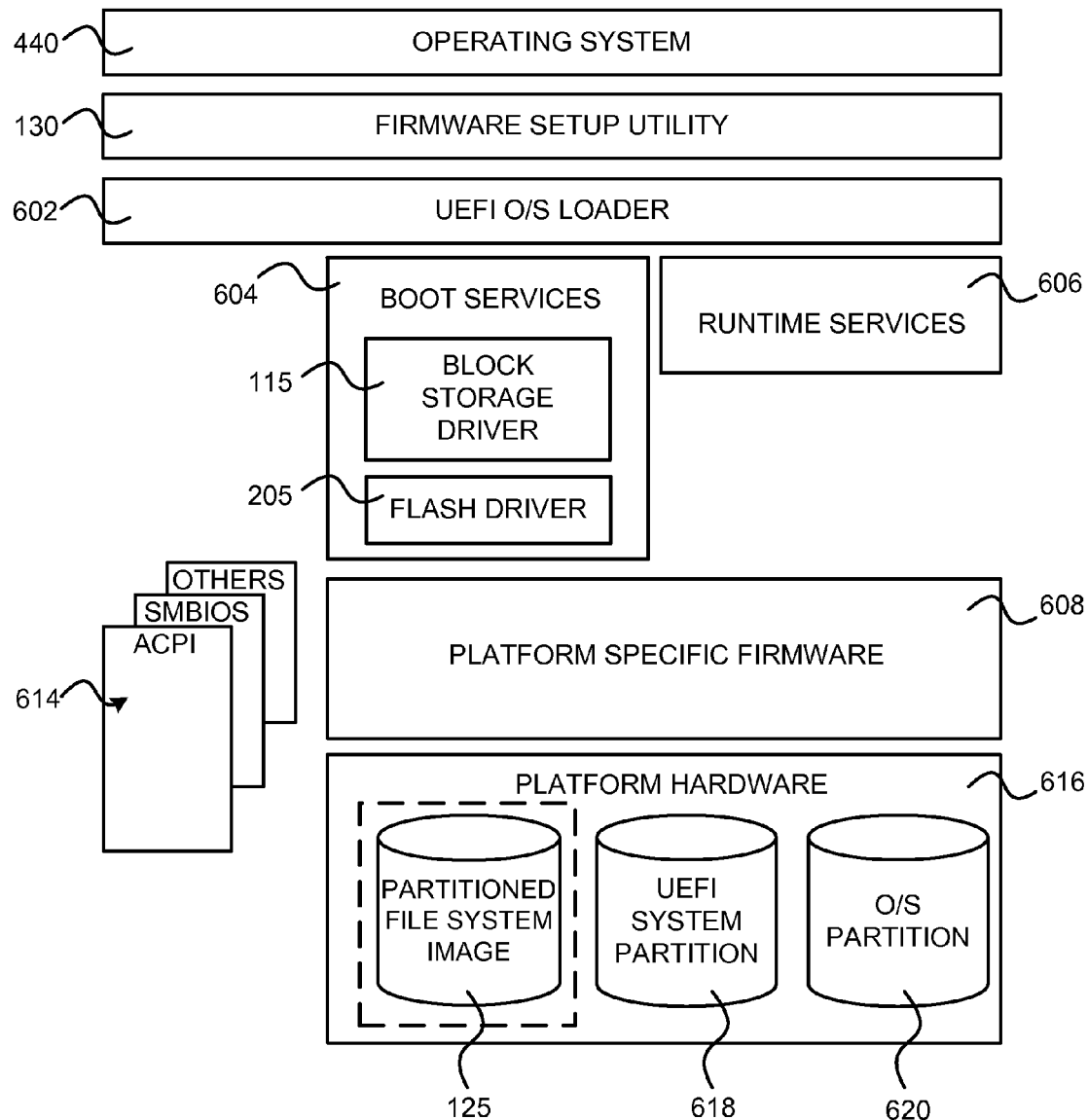
FIG. 6 is a block diagram illustrating an architecture for firmware that provides an operating environment for one or more examples presented herein.

Turning now to FIG. 6, a block diagram illustrates the architecture for a UEFI specification-compliant firmware that provides an operating environment for one or more examples presented herein. As shown in FIG. 6, the architecture can include platform hardware 616 and an operating system 440. A UEFI boot loader O/S Loader 602 ("OS boot loader 602") may be loaded from the UEFI system partition 618. The UEFI boot loader 602 may retrieve an OS image from the O/S partition 620. It should be noted that, although the preceding components may be used in the general operation of the computing system 100, in some examples (e.g., during recovery, installation or diagnostic testing), a UEFI GRUB 240 boot loader may be loaded from the partitioned file system image 125. Likewise, in some examples, instead of retrieving an OS image from the O/S partition 620, the UEFI GRUB 240 may retrieve an operating system kernel 235 from the partitioned file system image 125.

Once started, the OS boot loader 602 may continue to boot the complete operating system 140. In doing so, the OS boot loader 602 may use boot services 604 (which, in some configurations, may include the block storage driver 115 and the flash driver 205) and runtime services 606. The OS boot loader 602 may also interface to other supported specifications to survey, comprehend, and initialize the various platform components and the operating system software that manages them. Thus, interfaces 614 from other specifications may also be present on the system. For example, the Advanced Configuration and Power Management Interface ("ACPI") and the System Management BIOS ("SMBIOS") specifications may be supported.

UEFI boot services 604 may provide interfaces for devices and system functionality used during the boot phase. UEFI runtime services 606 may also be available to the UEFI boot loader 602 during the boot phase. For example, a set of runtime services may be presented to ensure appropriate abstraction of base platform hardware resources used by the operating system 440 during its operation. UEFI allows extension of platform firmware by loading UEFI driver and UEFI application images which, when loaded, have access to UEFI-defined runtime and boot services. Various program modules can provide the boot services and runtime services.

Based on the foregoing, it should be appreciated that technologies for accessing a bootable partition on a serial peripheral interface device have been presented herein. The mechanisms disclosed herein may further allow a computing system 100 to boot from the bootable partition during installation, recovery, or diagnostic testing, among other situations. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example examples and applications illustrated and described, and without departing from the true spirit and scope of the present invention, which is set forth in the following claim.

What is claimed is:

1. A computer-implemented method to create a bootable partition, the method comprising:
   exposing a file system image stored on a memory accessible through a serial peripheral interface;
   making the file system image accessible as a block storage device, wherein the block storage device processes requests to read and write files and directories stored within the file system image;

making the block storage device accessible as a partitioned file system image;

providing the partitioned file system image as a bootable partition; and using the partitioned file system image to boot a computing system.

2. The computer-implemented method of claim 1, wherein exposing the file system image comprises utilizing a flash driver to interface with the file system image.

3. The computer-implemented method of claim 2, wherein making the file system image accessible as a block storage device comprises utilizing a block storage driver to process requests to read or write to the file system image by way of the flash driver.

4. The computer-implemented method of claim 1, wherein making the file system image accessible as a block storage device comprises utilizing a block storage driver stored on a serial peripheral device.

5. The computer-implemented method of claim 1, wherein providing the partitioned file system image as the bootable partition comprises setting a configuration parameter by way of a firmware setup utility.

6. The computer-implemented method of claim 1, wherein the partitioned file system image is configured as a read-only file system.

7. The computer-implemented method of claim 1, further comprising providing one or more additional partitioned file system images as bootable partitions.

8. The computer-implemented method of claim 1, wherein the file system image comprises an operating system kernel.

9. A system comprising:

a central processing unit (CPU);

a non-volatile memory device in communication with the CPU over a serial peripheral interface, the non-volatile memory device comprising a block storage driver configured to make a file system image accessible as a block storage device, wherein the block storage device processes requests to read and write to files stored within the file system image, a partitioned file system image in communication with the block storage driver, and a firmware setup utility configured to provide the partitioned file system image as a bootable partition.

10. The system of claim 9, wherein the firmware setup utility sets the partitioned file system image as the bootable partition.

11. The system of claim 9, wherein the block storage driver configured to make the file system image accessible as a block storage device processes requests to read or write to the file system image.

12. The system of claim 9, wherein the partitioned file system image utilizes a file system protocol to interact with the block storage device as a file system.

13. The system of claim 9, wherein the partitioned file system image is updated by flash-updating the file system image.

14. The system of claim 13, wherein flash-updating the file system image comprises erasing and reprogramming a non-critical block of the non-volatile memory device.

15. A computer-readable storage medium having computer-executable instructions stored thereupon which, when executed by a computer, cause the computer to:

expose a file system image stored on a serial peripheral interface device;

making the file system image accessible as a block storage device, wherein the block storage device processes requests to read and write to files stored within the file system image;

make the file system image accessible as a partitioned file system image; and provide the partitioned file system image as a bootable partition.

16. The computer-readable storage medium of claim 15, comprising further computer-executable instructions to update the file system image by erasing and reprogramming a non-critical block on the serial peripheral interface device.

17. The computer-readable storage medium of claim 15, comprising further computer-executable instructions to make one or more additional partitioned file system images available as bootable partitions.

18. The computer-readable storage medium of claim 15, comprising further computer-executable instructions to boot from an operating system kernel contained in the file system image.

19. The computer-readable storage medium of claim 15, wherein making the file system image accessible as a block storage device comprises utilizing a block storage driver to process requests to read or write to the file system image.

20. The computer-readable storage medium of claim 15, wherein the partitioned file system image is configured as a read-write partition.

* * * * *